(12) United States Patent
Dong (10) Patent No.: US 12,477,389 B2
(45) Date of Patent: Nov. 18, 2025

(54) UPLINK TRANSMISSION METHOD, COMMUNICATION DEVICE AND STORAGE MEDIUM

(71) Applicant: Beijing Xiaomi Mobile Software Co., Ltd., Beijing (CN)

(72) Inventor: Xiandong Dong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 460 days.

(21) Appl. No.: 18/003,114

(22) PCT Filed: Jul. 28, 2020

(86) PCT No.: PCT/CN2020/105262
§ 371 (c)(1),
(2) Date: Dec. 22, 2022

(87) PCT Pub. No.: WO2022/021082
PCT Pub. Date: Feb. 3, 2022

(65) Prior Publication Data
US 2023/0254731 A1      Aug. 10, 2023

(51) Int. Cl.
H04W 28/02      (2009.01)
H04W 72/1268   (2023.01)
H04W 74/0836   (2024.01)

(52) U.S. Cl.
CPC ... *H04W 28/0278* (2013.01); *H04W 72/1268* (2013.01); *H04W 74/0836* (2024.01)

(58) Field of Classification Search
CPC ......... H04W 28/0278; H04W 72/1268; H04W 74/0833; H04W 72/21; H04W 74/0836
See application file for complete search history.

(56) References Cited

U.S. PATENT DOCUMENTS

| 2015/0181461 | A1   | 6/2015  | Kim et al.              |
|--------------|------|---------|-------------------------|
| 2019/0320467 | A1 * | 10/2019 | Freda ........ H04W 74/004 |
| 2020/0059345 | A1 * | 2/2020  | Pelletier ...... H04B 7/00 |
| 2020/0260341 | A1 * | 8/2020  | Jang ........ H04W 74/0838 |
| 2021/0051712 | A1 * | 2/2021  | Hedayat ...... H04W 48/14 |
| 2022/0086855 | A1 * | 3/2022  | Mallick ...... H04W 72/1215 |

FOREIGN PATENT DOCUMENTS

| CN | 103327536 A | 9/2013 |
|----|-------------|--------|
| CN | 103535102 A | 1/2014 |
| CN | 107222827 A | 9/2017 |
| CN | 111385909 A | 7/2020 |

(Continued)

OTHER PUBLICATIONS

"Consideration on SR and DRX in NTN," Proceedings of the 3GPP TSG RAN WG2 Meeting #108, ZTE Corporation, Sanechips, R2-1915422, Nov. 18, 2019, Reno, Nevada, 9 pages.

(Continued)

*Primary Examiner* — Dinh Nguyen
(74) *Attorney, Agent, or Firm* — McCoy Russell LLP (57) ABSTRACT

An uplink transmission method applied to a terminal includes: sending a buffer stat us report (BSR) during a 2-step random access channel (RACH) or sending the BSR on an uplink resource obtained through scheduling request (SR) according to resource configuration of the SR and resource configuration of the 2-step RACH.

12 Claims, 5 Drawing Sheets

(56) References Cited

FOREIGN PATENT DOCUMENTS

| EP | 3291628 A1 | 3/2018 |
|---|---|---|
| EP | 3569029 A1 | 11/2019 |
| IN | 201937044775 A | 12/2019 |
| KR | 1020200083928 A | 7/2020 |
| WO | 2018137245 A1 | 8/2018 |
| WO | 2019095390 A1 | 5/2019 |
| WO | 2020030968 A1 | 2/2020 |
| WO | 2020037675 A1 | 2/2020 |

OTHER PUBLICATIONS

"Discussions on 2 Steps RACH Procedure," Proceedings of the 3GPP TSG RAN WG2 Meeting AH_NR Meeting, Sony, R1-1700471, Jan. 17, 2017, Spokane, Washington, 5 pages.

"Corrections to stage 2 description of FeMTC and eNB-IOT," Proceedings of the 3GPP TSG-RAN WG2 Meeting #98, Intel Corporation, R2-1706113, May 15, 2017, Hangzhou, China, 19 pages.

"Miscellaneous corrections on eMIMO," Proceedings of the 3GPP TSG-RAN WG2 Meeting #109bis-e, Samsung, R2-2003901, Apr. 20, 2020, Electronic Meeting, 136 pages.

\* cited by examiner

UPLINK TRANSMISSION METHOD, COMMUNICATION DEVICE AND STORAGE MEDIUM

CROSS REFERENCE TO RELATED APPLICATION

The present application is the U.S. National Stage Application of International Application No. PCT/CN2020/105262 filed on Jul. 28, 2020, the entire content of which is incorporated herein by reference for all purposes.

BACKGROUND

Non-terrestrial networks (NTN) have been introduced to 5G NR (5G New Radio). The NTN includes a satellite communication network. The satellite communication network features a large cell radius, specifically, a medium/low earth orbit satellite has a cell coverage radius of 100 km to 1000 km, and a synchronous orbit satellite has a cell coverage radius of several kilometers.

SUMMARY

Examples of the disclosure relate to, but are not limited to, the field of radio communication, and particularly relate an uplink transmission method, a communication device and a storage medium.

A first aspect of an example of the disclosure provides an uplink transmission method. The method is applied to a terminal and includes:

sending, according to resource configuration of a scheduling request (SR) and resource configuration of a 2-step random access channel (RACH), a buffer status report (BSR) during the 2-step RACH or sending the BSR on an uplink resource obtained through the SR.

A second aspect of an example of the disclosure provides an uplink transmission method. The method is applied to a base station and includes:

receiving, according to resource configuration of a scheduling request (SR) and resource configuration of a 2-step RACH, a BSR during the 2-step RACH or receiving the BSR on an uplink resource configured through the SR.

A third aspect of an example of the disclosure provides a communication device. The communication device at least includes a processor and a memory for storing an executable instruction capable of being run on the processor, and when the processor is configured to run the executable instruction, the executable instruction executes the following step:

send, according to resource configuration of a scheduling request (SR) and resource configuration of a 2-step random access channel (RACH), a buffer status report (BSR) during the 2-step RACH or send the BSR on an uplink resource obtained through the SR.

A fourth aspect of an example of the disclosure provides a non-transitory computer-readable storage medium. The computer-readable storage medium stores a computer-executable instruction, and the computer-executable instruction implements steps of the above uplink transmission method applied to the terminal when executed by a processor.

A fifth aspect of an example of the disclosure provides a communication device. The communication device at least includes a processor and a memory for storing an executable instruction capable of being run on the processor, and when the processor is configured to run the executable instruction, the executable instruction executes the above uplink transmission method applied to the base station.

A sixth aspect of an example of the disclosure provides a non-transitory computer-readable storage medium. The computer-readable storage medium stores a computer-executable instruction, and the computer-executable instruction implements the above uplink transmission method applied to the base station when executed by a processor.

BRIEF DESCRIPTION OF THE DRAWINGS

The accompanying drawings here are incorporated into the description as a constituent part of the description, illustrate examples conforming to the disclosure, and serve to explain principles of the examples of the disclosure along with the description.

DETAILED DESCRIPTION

Since the satellite is high and far away from the ground, transmission of satellite communication will spend tens or even hundreds of milliseconds, resulting in a long transmission delay.

How to shorten the transmission delay is one of the important research directions of the 5G NTN.

The disclosure provides an access control method, a communication device and a storage medium.

The examples will be described in detail here and shown in the accompanying drawings illustratively. When the following descriptions relate to the accompanying drawings, unless otherwise specified, the same numeral in different accompanying drawings denotes the same or similar element. The examples described in the following examples do not represent all implementations consistent with examples of the disclosure. On the contrary, they are examples of apparatuses and methods consistent with some aspects of the examples of the disclosure as described in detail in the appended claims.

The terms used in the examples of the disclosure are for the purpose of describing particular examples and are not intended to limit the examples of the disclosure. As used in the examples and the appended claims of the disclosure, singular forms "a" and "the" are intended to include plural forms as well, unless otherwise clearly indicated in the context. It can be understood that the term "and/or" as used here refers to and encompasses any or all possible combinations of one or more of the associated listed items.

It can be understood that although the terms first, second, third, etc. can be employed in the examples of the disclosure to describe various information, such information cannot be limited to these terms. These terms are used to distinguish the same type of information from each other. For example, first information may also be referred to as second information, and similarly, second information may also be referred to as first information, without departing from the scope of the examples of the disclosure. Depending on the context, the word "if" and "in case" as used here can be interpreted as "at the time of", "when", or "in response to determining".

In order to better describe any one of the examples of the disclosure, an application scenario of access control is taken as an example for illustration in an example of the disclosure.

Figure 1:
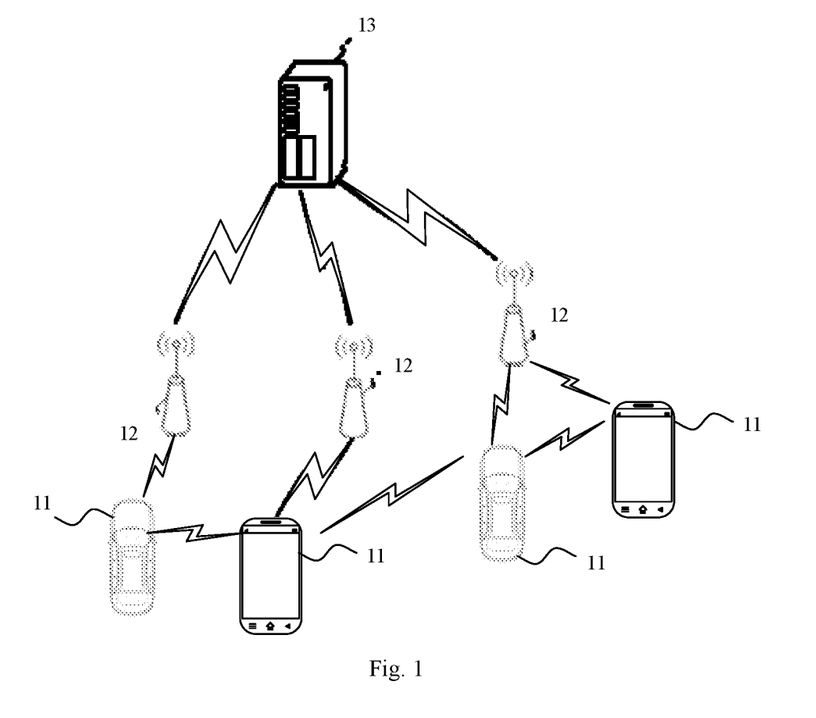
FIG. 1 is a schematic structural diagram of a wireless communication system shown according to an example.

With reference to FIG. 1, a schematic structural diagram of a wireless communication system provided in an example of the disclosure is shown. As shown in FIG. 1, the wireless communication system is based on a cellular mobile communication technology, and may include: several terminals 11 and several base stations 12.

The terminals 11 may be devices providing voice and/or data connectivity for a user. The terminal 11 may be in communication with one or more core networks via a radio access network (RAN). The terminal 11 may be an internet of things terminal, such as a sensor device, a mobile telephone (also called a cellular telephone) or a computer having an internet of things terminal, which may be a fixed, portable, pocket and handheld apparatus, an apparatus built in a computer or a vehicle-mounted apparatus. For example, a station (STA), a subscriber unit, a subscriber station, a mobile station, a mobile, a remote station, an access point, a remote terminal, an access terminal, a user terminal, a user agent, a user device or user equipment (UE). Alternatively, the terminal 11 may also be a device of an unmanned aerial vehicle. Alternatively, the terminal 11 may be a vehicle-mounted device, for example, a trip computer with a radio communication function or a radio terminal to which a trip computer is externally connected. Alternatively, the terminal 11 may also be a roadside device, for example, a street lamp having a radio communication function, a signal lamp or other roadside devices.

The base station 12 may be a network side device in the wireless communication system. The wireless communication system may be the 4th generation mobile communication (4G) system, which is also called a long term evolution (LTE) system; and alternatively, the wireless communication system may be 5G system, which is also called a new radio (NR) system or a 5G NR system. Alternatively, the wireless communication system may also be a next-generation system of the 5G system. An access network in the 5G system may be called a new generation-radio access network (NG-RAN).

The base station 12 may be an evolved base station (eNB) used in the 4G system. Alternatively, the base station 12 may also be a base station (gNB) adopting centralized and distributed architecture in the 5G system. When adopting centralized and distributed architecture, the base station 12 generally includes a central unit (CU) and at least two distributed units (DUs). The central unit is provided with protocol stacks of a packet data convergence protocol (PDCP) layer, a radio link control (RLC) layer, and a media access control (MAC) layer; and the distributed unit is provided with a protocol stack of a physical (PHY) layer. A specific implementation of the base station 12 is not limited in examples of the disclosure.

The base station 12 is in radio connection with the terminal 11 through a wireless air interface. In different examples, the wireless air interface is a wireless air interface based on the 4th generation mobile communication network technology (4G) standard; alternatively, the wireless air interface is a wireless air interface based on the 5th generation mobile communication network technology (5G) standard, such as new radio; and alternatively, the wireless air interface may further be a wireless air interface based on a next-generation mobile communication network technology standard of 5G.

In some examples, an end to end (E2E) connection may be further established between the terminals 11. For example, scenarios such as vehicle to vehicle (V2V) communication, vehicle to infrastructure (V2I) communication, and vehicle to pedestrian (V2P) communication in vehicle to everything (V2X) communication are provided.

In some examples, the above wireless communication system may further include a network management device 13.

Several base stations 12 are each connected to the network management device 13. The network management device 13 may be a core network device in the wireless communication system. For example, the network management device 13 may be a mobility management entity (MME) in an evolved packet core (EPC). Alternatively, the network management device may also be other core network devices, such as a serving gateway (SGW), a public data network gateway (PGW), a policy and charging rules function (PCRF), or a home subscriber server (HSS). An implementation form of the network management device 13 is not limited in examples of the disclosure.

Figure 2:
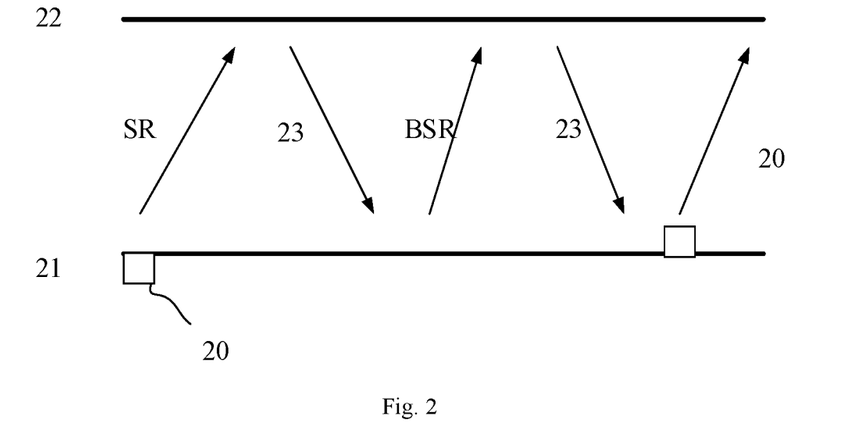
FIG. 2 is a schematic flow diagram of an uplink transmission process shown according to an example.

As shown in FIG. 2, for a terrestrial network (TN), when uplink data 20 arrives at user equipment (UE) 21, that is, the uplink data arrives at a buffer, the user equipment 21 sends a buffer status report (BSR) to a base station 22 (gNB, g-NodeB) in the network. If the UE does not have an uplink resource for sending the BSR at this time, the UE sends a scheduling request (SR) to the network to request an uplink resource to send the BSR. After receiving the BSR, the network sends an uplink scheduling grant 23 (UL grant) to the UE, and the UE starts to send uplink data 20.

In an example, when the UE is needed to send the SR but does not have a physical uplink control channel (PUCCH) resource for sending the SR, the UE may initiate 4-step random access channel (4-step RACH), and send the BSR on a resource configured to a random access message 3 (MSG3).

However, if this mechanism is also applied to a non-terrestrial network (NTN), the UE is needed to wait for at least 2 round-trip time (RTT) before sending data, which causes a long data transmission delay of the UE, and may not satisfy a quality of service (QOS) requirement.

Figure 3:
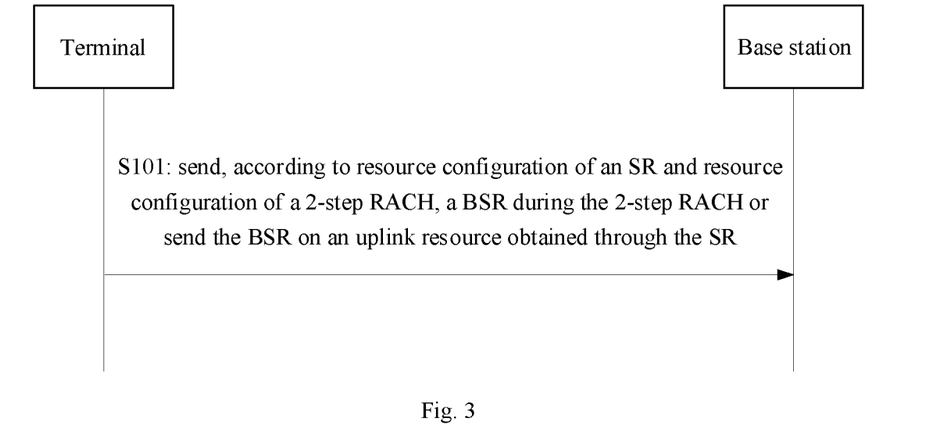
FIG. 3 is a schematic flow diagram 1 of an uplink transmission method shown according to an example.

As shown in FIG. 3, an example of the disclosure provides an uplink transmission method. The method is applied to a terminal and includes:

Step S101: send, according to resource configuration of an SR and resource configuration of a 2-step RACH, a BSR during the 2-step RACH or send the BSR on an uplink resource obtained through the SR.

On the basis of the characteristics of the above NTN, in an example of the disclosure, the BSR may be sent on a physical uplink shared channel (PUSCH) through a random access message A (MSGA) during the 2-step random access channel (2-step RACH).

In an example of the disclosure, the terminal may be any communication device including the above user equipment (UE), which is referred to as UE for short below.

A random access process refers to a process after the UE sends a request to attempt to access a network and before a basic signaling connection is established between the UE and the network. The random access process is classified into a contention based random access process and a contention free based random access process. The contention based random access process includes a process of a 4-step RACH and the above process of a 2-step RACH.

The process of the 2-step RACH is a process in which the terminal and the base station interact random access messages (MSGs) step by step, which include an MSGA and an MSGB.

Step 1: send the MSGA to the base station by the UE. The MSGA includes a random access preamble sequence and physical uplink shared channel (PUSCH) data. The PUSCH data may include identification information for identification of the UE, such as a cell-radio network temporary identifier (C-RNTI).

Step 2: send the MSGB to the UE by the base station. The MSGB includes a random access response and contention resolution information.

The process of the 4-step RACH is also a process in which the terminal and the base station interact random access messages step by step, which include four random access messages: an MSG1, an MSG2, an MSG3 and an MSG4.

Step 1: send the MSG1 to the base station by the UE. The MSG1 includes an access preamble sequence, and the UE sends the above MSG1 through a physical random access channel (PRACH).

Step 2: send the MSG2 to the UE by the base station. The MSG2 includes a random access response, and moreover, the base station carries out scrambling through a random access radio network temporary identifier (RA-RNTI).

Step 3: send the MSG3 to the base station by the UE. The MSG3 includes identity identification information of the UE, for example, a C-RNTI.

Step 4: send the MSG4 to the UE by the base station. The base station carries a contention resolution Identity (CRI) in the MSG4 and send same to the UE through a media access control layer-control element (MAC_CE), so as to realize final random access.

Compared with the 4-step RACH, the 2-step RACH only exchanges information once such that a transmission delay may be shortened.

In an example of the disclosure, since network configuration may not have enough 2-step RACH resources at any time, according to resource configuration, the BSR may be sent through the process of the 2-step RACH or the BSR may be sent through the uplink resource obtained through the SR.

Here, the above resource configuration of the SR and the resource configuration of the RACH are resources capable of being used for transmitting the BSR in a network, and may be obtained according to instructions of the base station, or may be determined on the basis of a protocol.

It can be noted that in an example of the disclosure, after uplink data of the UE arrives, no matter the BSR is sent during the RACH or the BSR is sent on the uplink resource obtained through the SR, the UE is needed to wait for an uplink scheduling grant of the base station to send the uplink data.

In addition, since the BSR may not be sent during the RACH when only an SR resource is configured on the base station, a manner of obtaining the uplink resource by sending the SR and then sending the BSR is still used.

In an example of the disclosure, the uplink resource is obtained through the SR, that is, the uplink resources is configured after the UE obtains an uplink scheduling grant of the base station by sending the SR to the base station, and if the BSR is sent through the uplink resource obtained through the SR, an interaction between the UE and the base station is needed. During the 2-step RACH, the UE may directly send the BSR through the MSGA without waiting for configuration of the uplink resource for sending the BSR, so as to shorten a transmission delay.

An example of the disclosure provides an implementation method for uplink transmission, that is, according to resource configuration, a BSR is sent during a 2-step RACH or the BSR is sent on an uplink resource obtained through an SR. In this way, according to the resource configuration, the BSR is sent by choosing an appropriate transmission resource. Compared with a manner of uniformly sending the BSR through the uplink resource obtained through the SR, this manner flexibly uses a characteristic of a short delay of the process of the 2-step RACH and a characteristic that the uplink resource obtained through the SR has little influence on a random access resource such that a transmission delay may be shortened while a transmission requirement is satisfied as much as possible.

In some examples, the step of sending, according to resource configuration of an SR and resource configuration of a 2-step RACH, a BSR during the 2-step RACH or sending the BSR on an uplink resource obtained through the SR includes:

send the BSR during the 2-step RACH according to the resource configuration of the 2-step RACH in response to not configuring the SR resource.

In an example of the disclosure, if the SR resource is not configured but an RACH resource is configured, the UE preferentially uses the 2-step RACH resource to send the BSR during the 2-step RACH. Certainly, if only a 4-step RACH resource is configured, the UE may only send the BSR during the 4-step RACH. That is, in practical application, priority of sending the BSR through the process of the 2-step RACH may be configured to be higher than priority of sending the BSR through the process of the 4-step RACH.

In this way, when a network configures a 2-step RACH resource, transmission may be carried out in a manner with a lowest delay.

In some examples, the step of sending the BSR during the 2-step RACH according to the resource configuration of the 2-step RACH in response to not configuring the SR resource includes:

determine that the BSR is allowed to be sent during the 2-step RACH according to the resource configuration of the 2-step RACH in response to not configuring the SR resource, and send the BSR in an MSGA during the 2-step RACH.

In an example of the disclosure, the process of the 2-step RACH includes the Step 1 of sending the MSGA to the base station by the UE and the Step 2 of receiving the MSGB sent by the base station by the UE. The UE may directly carries the BSR in the MSGA to send the BSR to the base station through the first step of the process of the 2-step RACH, such that the UE may send the BSR without waiting for a feedback of the base station, shortening a delay.

In some examples, the step of sending, according to resource configuration of the SR and resource configuration of the 2-step RACH, the BSR during the 2-step RACH or sending the BSR on the uplink resource obtained through the SR includes:

send the BSR on the uplink resource obtained through the SR in response to configuring the SR resource but not configuring a 2-step RACH resource for sending the BSR.

A network may only configure the SR resource, or may configure both the SR resource and the 4-step RACH resource. The 4-step RACH resource also has a long delay, and moreover, too many RACH resources may be occupied if the 4-step RACH resources are used, which affects a RACH capacity and increases a probability of RACH collision. In the situation that a delay requirement is low or only the SR resource and the 4-step RACH resource are configured, the above BSR may be preferentially sent through the SR, thus reducing occupation of the RACH resources.

In some examples, the step of sending, according to resource configuration of the SR and resource configuration of the 2-step RACH, the BSR during the 2-step RACH or sending the BSR on the uplink resource obtained through the SR includes:

send, according to a data volume of the BSR in response to configuring the SR resource and the 2-step RACH resource for sending the BSR, the BSR during the 2-step RACH or send the BSR on the uplink resource obtained through the SR;

or send, according to quality of service (QOS) of a service corresponding to the BSR in response to configuring the SR resource and the 2-step RACH resource for sending the BSR, the BSR during the 2-step RACH or send the BSR on the uplink resource obtained through the SR;

or send, according to a base station instruction in response to configuring the SR resource and the 2-step RACH resource for sending the BSR, the BSR during the 2-step RACH or send the BSR on the uplink resource obtained through the SR.

Here, considering that QoS requirements of different services are different, data volumes to be sent are also different, such that requirements for access manners are inconsistent. A manner of sending the BSR may also be dynamically chosen according to data volumes and QoS of services.

The BSR carries a data volume of data to be sent and a corresponding service identifier. When a network configures both the SR resource and the 2-step RACH resource, the UE may determine to choose which manner to send the BSR according to states of the BSR.

In this way, the transmission manner may be flexibly configured according to different services, and QoS requirements of the services are satisfied while occupation of RACH resources is reduced as much as possible.

In some examples, the step of sending, according to the data volume of the BSR, the BSR during the 2-step RACH or sending the BSR on the uplink resource obtained through the SR includes:

send the BSR on the uplink resource obtained through the SR in response to determining that the data volume of the BSR is greater than a predetermined data volume threshold; and send the BSR during the 2-step RACH in response to determining that the data volume of the BSR is less than or equal to the predetermined data volume threshold.

In an example of the disclosure, the predetermined data volume threshold may be determined according to RACH resources, for example, a great data volume threshold may be set if there are sufficient RACH resources, and a small data volume threshold may be set if there are fewer RACH resources. Alternatively, the predetermined data volume threshold may be determined according to a time relation. Assuming that time needed for sending all data by UE is T1 and time needed for obtaining an uplink scheduling grant for sending data by sending the SR by the UE is T2, if T2/T1 is less than a certain value, for example, T2/T1 is close to zero, the UE chooses a method of sending the BSR by obtaining the uplink resource by sending the SR. Certainly, the data volume threshold may be based on a protocol specification, indicated by the base station or implemented and decided by the UE.

If the data volume of the BSR is greater than the data volume threshold, it is indicated that the time needed for obtaining the uplink scheduling grant for sending the uplink data by the UE is negligible relative to the time needed for sending all the data by the UE, that is, a time delay for sending data by obtaining the uplink scheduling grant through the SR by the UE does not affect user experience and does not occupy the RACH resource. In this way, the BSR may be sent through the uplink resource obtained through the SR.

In some examples, the step of sending, according to the QoS of a service corresponding to the BSR, the BSR during the 2-step RACH or sending the BSR on the uplink resource obtained through the SR includes:

send the BSR on the uplink resource obtained through the SR in response to determining that an allowable delay of the QoS is greater than a predetermined duration threshold; and send the BSR during the 2-step RACH in response to determining that the allowable delay of the QoS is less than or equal to the predetermined duration threshold.

In an example of the disclosure, the predetermined duration threshold is a duration threshold for distinguishing maximum delays specified by QoS corresponding to different services. If the allowable delay specified by the QoS of the service exceeds the predetermined duration threshold, it may be considered that the QoS requirement of the service is low, and then occupation of resources may be given priority without providing too much requirements on delay duration. The BSR may be sent through the uplink resource obtained through the SR.

If the allowable delay specified by the QoS of the service is less than or equal to the predetermined duration threshold, it may be considered that the QoS requirement of the service is high, and then the delay problem is needed to be given priority to shorten the delay as much as possible. In this case, the BSR is sent during the 2-step RACH, so as to shorten the delay.

Certainly, in practical application, the manner of sending the BSR may also be chosen in combination with the above data volume and the QoS requirement of the service, for example, if the QoS requirement of the service is not high and the data volume of the BSR is small, the BSR may be preferentially sent during the 2-step RACH, such that the RACH resources may not be greatly affected while the delay is shortened. For another example, if the QoS requirement of the service is high, but the RACH resources are scarce, and the data volume of the BSR is large, in order to improve the probability of successful access, part of delay duration is sacrificed, and the BSR is sent through the uplink resource obtained through the SR. In this way, the actual service requirement and the network resource capacity may be simultaneously considered, such that the delay requirement and the resource occupation requirement are balanced.

In some examples, the step of sending, according to the base station instruction, the BSR during the 2-step RACH or sending the BSR on the uplink resource obtained through the SR includes:

send the BSR on the uplink resource obtained through the SR in response to the base station instruction to send the BSR on the uplink resource obtained through the SR; and send the BSR through an MSGA during the 2-step RACH in response to the base station instruction to send the BSR during the 2-step RACH.

In an example of the disclosure, the UE may determine an uplink resource for sending the BSR directly according to the received base station instruction. The base station instruction is directly obtained without analyzing network resources or service requirements. In this way, if the base station specifies the uplink resources for sending the BSR, the UE is not needed to make a judgment, so as to save data operation processing of the UE.

Figure 4:
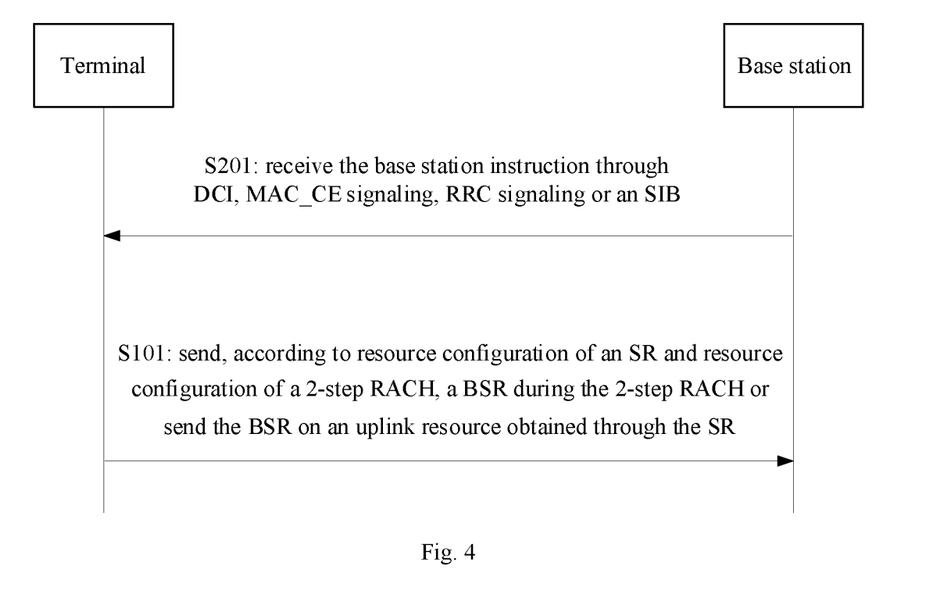
FIG. 4 is a schematic flow diagram 2 of an uplink transmission method shown according to an example.

In some examples, as shown in FIG. 4, the method further includes:

Step S201: receive the base station instruction through DCI, MAC_CE signaling, RRC signaling or an SIB.

Here, the DCI is downlink control information carried by a downlink physical control channel, and is used for carrying out uplink and downlink resource configuration, providing HARQ information, carrying out power control, etc. The UE may obtain a manner of sending the BSR indicated by the base station through the DCI.

The MAC_CE signaling is control signaling of a media access control layer, and the base station issues some control signaling to the UE through the MAC_CE signaling, and meanwhile, the indicated BSR transmission manner may be carried in the MAC_CE signaling.

The RRC signaling is radio resource control signaling, and is used for radio resource management, which includes channel distribution, etc. The base station may carry the indicated BSR transmission manner in the RRC signaling. The UE determines a manner of sending the BSR through the received RRC signaling.

In addition, the UE may also receive the base station instruction through the SIB, and the SIB may be an SIB1, an SIB2, etc., or other system information blocks.

In the step S101, the UE may obtain the above resource configuration of the SR and the resource configuration of the 2-step RACH according to the base station instruction.

Figure 5:
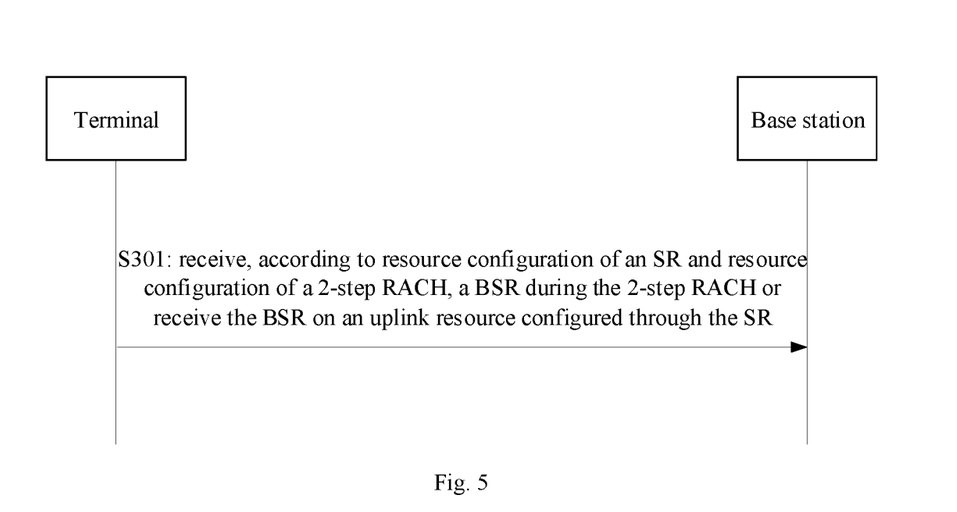
FIG. 5 is a schematic flow diagram 3 of an uplink transmission method shown according to an example.

As shown in FIG. 5, an example of the disclosure provides an uplink transmission method. The method is applied to a base station and includes:

Step S301: receive, according to resource configuration of an SR and resource configuration of a 2-step RACH, a BSR during the 2-step RACH or receive the BSR on an uplink resource configured through the SR.

In an example of the disclosure, a manner of sending the BSR by UE may be determined by the base station, or the manner of sending the BSR by the UE may be determined based on resource configuration, so as to determine a manner of receiving the BSR.

Here, the resource configuration of the SR and the resource configuration of the 2-step RACH may be determined based on a protocol, or may be determined by the base station according to conditions of network resources.

The base station may determine an appropriate manner of receiving the BSR according to conditions of resource configuration of the network, then an uplink scheduling grant is provided for the UE, and uplink data sent by the UE is received, such that network resources may be reasonably used while a requirement of a short delay is satisfied as much as possible.

In some examples, the step of receiving, according to resource configuration of the SR and resource configuration of the 2-step RACH, the BSR during the 2-step RACH or receiving the BSR on the uplink resource configured through the SR includes:

receive the BSR during the 2-step RACH in response to not configuring an SR resource.

If the SR resource is not configured but a 2-step RACH resource is configured, no matter whether a 4-step RACH resource is configured, the base station preferentially chooses to receive the BSR on the 2-step RACH, so as to shorten a transmission delay.

In some examples, the step of receiving the BSR during the 2-step RACH in response to not configuring the SR resource includes:

receive the BSR through an MSGA during the 2-step RACH of 2-step random access in response to not configuring the SR resource but configuring the 2-step RACH resource of the 2-step random access.

In an example of the terminal side, the process of the 2-step RACH has been described in detail, which is not repeated here. When the BSR is received, the BSR may be received through the MSGA sent by the terminal in the first step.

In some examples, the step of receiving, according to resource configuration of the SR and resource configuration of the 2-step RACH, the BSR during the 2-step RACH or receiving the BSR on the uplink resource configured through the SR includes:

receive the BSR on the uplink resource configured through the SR in response to configuring the SR resource but not configuring the 2-step RACH resource for sending the BSR.

If an SR resource is configured but the 2-step RACH resource is not configured, no matter whether the 4-step RACH resource is configured, the BSR may be received through the uplink resource configured through the SR, so as to reduce the occupation of the RACH resource. Here, configuration of the SR resource and configuration of the RACH resource refers to resource configuration capable of being used for sending the BSR. The resource configuration may be specified by a protocol, or may be dynamically determined by the base station according to network states.

In some examples, the step of receiving, according to resource configuration of the SR and resource configuration of the 2-step RACH, the BSR during the 2-step RACH or receiving the BSR on the uplink resource configured through the SR includes:

receive the BSR during the 2-step RACH or receive the BSR on the uplink resource configured through the SR in response to configuring the SR resource and the 2-step RACH resource for sending the BSR.

If the SR resource and the 2-step RACH resource are configured, the corresponding BSR may be received according to a manner of sending the BSR chosen by the UE. Certainly, the base station may instruct the manner of sending the BSR by the UE, and then the base station receives the BSR according to an instruction to the UE.

In some examples, the method further includes:

issue a base station instruction for instructing UE to send the BSR on the uplink resource configured through the SR or send the BSR during the 2-step RACH; and the step of receiving, according to resource configuration of the SR and resource configuration of the 2-step RACH, the BSR during the 2-step RACH or receiving the BSR on the uplink resource configured through the SR includes:

receive the BSR during the 2-step RACH in response to configuring the SR resource and the 2-step RACH resource for sending the BSR and in response to the base station instruction to instruct the UE to send the BSR during the 2-step RACH; and receive the BSR on the uplink resource configured through the SR in response to configuring the SR resource and the 2-step RACH resource and in response to the base station instruction to instruct the UE to send the BSR on the uplink resource configured through the SR.

In an example of the disclosure, the base station issues the base station instruction to the UE first, and the base station instruction is used for instructing a manner of sending the BSR by the UE, that is, instructing the UE to send the BSR by using the SR resource or the RACH resource.

When both the SR resource and the 2-step RACH resource are configured, the base station may instruct the UE to send the BSR by choosing one of same. It can be understood that the base station may choose to instruct a manner of sending the BSR by the UE according to its own network states, for example, congestion conditions, RACH resource use rates, etc. The instruction may be made according to a predetermined priority or may be randomly made.

Certainly, if a network only configure the 4-step RACH resource, the base station may also instruct the UE to send the BSR during the 4-step RACH.

In some examples, the step of issuing the base station instruction for instructing the UE to send the BSR on the uplink resource configured through the SR or send the BSR during the 2-step RACH includes:

issue the base station instruction based on DCI, MAC_CE signaling, RRC signaling or an SIB according to the resource configuration of the SR and the resource configuration of the 2-step RACH.

In an example of the disclosure, the base station may, when issuing the above DCI, MAC_CE signaling, RRC signaling or an SIB according to the resource configuration of the SR and the resource configuration of the 2-step RACH, issue the base station instruction indicating a manner of sending the BSR by the UE to the UE.

Here, the resource configuration of the SR and the resource configuration of the 2-step RACH may be determined by the base station or may be determined based on a protocol.

An example of the disclosure further provides instances as follows:

In the above examples, in the TN, when uplink data arrives at the UE, the UE obtains the uplink scheduling grant by sending the BSR so as to send the uplink data in three manners:

firstly, obtain the uplink resource by sending the SR, and sending the BSR on the uplink resource obtained through the SR;

secondly, send the BSR through the MSGA of the 2-step RACH; and thirdly, send the BSR through the MSG3 of the 4-step RACH.

In an example of the disclosure, the above three manners may be applied to the NTN. However, due to the characteristics of the NTN, a delay may be greatly affected. Delay duration of the above first manner and third manner is long, and may not satisfy the QoS requirement. The second manner and the third manner occupy RACH resources.

The method of sending the BSR through the 2-step RACH and then obtaining the uplink scheduling grant by the UE results in high RACH resource overhead, affects the RACH capacity, and increases the probability of RACH collision, thus affecting normal random access of the UE and a success rate of sending the BSR by the UE. In addition, a short delay is not needed for sending all uplink data by the UE, and an existing uplink grant for obtaining and sending uplink data may also satisfy QoS requirements of some services. For the NTN, considering that the above plurality of solutions are needed to be supported at the same time, it is needed to coordinate the UE to use which solution to send the BSR, so as to obtain the uplink scheduling grant to send uplink data.

In an example of the disclosure, the above three BSR transmission manners may be used in a coordinated manner according to conditions of network resource configuration and service requirements, so as to satisfy a requirement of a short delay as much as possible and reduce occupation of resources.

1. When a network configures a resource for sending the SR by the UE, and a resource for sending the BSR through the 2-step RACH by the UE, the UE determines to use a method of sending the BSR, which includes the following situations:

1) The UE determines a method of sending the BSR based on a state of the BSR, and in the case that the BSR is greater than a predetermined data volume threshold, the UE sends the BSR after obtaining an uplink grant by sending the SR. In this way, since the data volume to be sent by the UE is large, a start delay for sending data and time needed for sending data may be ignored, which does not affect user experience.

2) The UE determines a method of sending the BSR based on a QoS requirement of a service, and in the case that the QoS requirement is high, for example, a short delay is needed, the UE chooses to send the BSR during the 2-step RACH. In the case that the QoS requirement is low, the UE chooses to send the SR to obtain an uplink resource for sending the BSR.

2. The base station determines a method (an implicit manner) for sending the BSR by the UE.

1) In the case that a network only configures a resource for sending the SR for the UE, the base station instructs the UE to send the SR first and then send the BSR.

2) In the case that the network does not configure the resource for sending the SR but configures the 2-step RACH resource for the UE, the UE is instructed to send the BSR during the 2-step RACH.

3) In the case that the network does not configure the resource for sending the SR and the 2-step RACH resource capable of being used for sending the BSR, but configures a 4-step RACH resource capable of being used for sending the BSR for the UE, the UE is instructed to send the BSR during the 4-step RACH.

3. The base station determines a method (an explicit manner) for sending the BSR by the UE.

In the case that the network configures the resource for sending the SR and the resource for sending the BSR through the 2-step RACH for the UE, the method of sending the BSR by the UE may be determined in the following manner:

1) The base station instructs all UE to send BSRs through uplink resources obtained by SRs or send BSRs through the 2-step RACH manner in a system information block, for example, when there are little UE carrying out a RACH in the system and sufficient resources for the RACH, a network configures all UE in the system to send BSRs through the 2-step RACH manner, such that the UE may quickly send uplink data. On the contrary, in order to preferentially guarantee normal random access of the UE in the system, all the UE in the system are configured to send the BSR through the uplink resources obtained through the SRs.

2) The base station instructs a method of sending the BSR by the UE, and the base station may configure a method of sending the BSR by the UE through DCI, MAC_CE, RRC signaling, etc. Specifically, a network may determine a method of sending the BSR by the UE based on use conditions of RACH resources of the network. In the case that there are severely little RACH resources, the network may configure some UE to send SRs through a traditional method: or the network determines a method of sending BSRs by the UE based on QoS characteristics of historical services of the UE, or the above two methods are combined.

Figure 6:
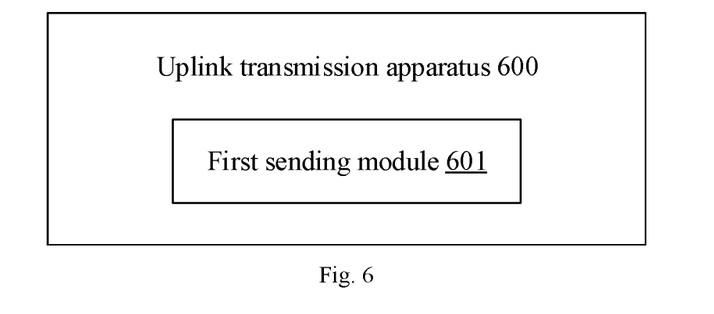
FIG. 6 is a schematic structural diagram 1 of an uplink transmission apparatus shown according to an example.

As shown in FIG. 6, an example of the disclosure further provides an uplink transmission apparatus 600. The uplink transmission apparatus is applied to a terminal and includes:
a first sending module 601 configured to send, according to resource configuration of a scheduling request (SR) and resource configuration of a 2-step RACH, a buffer status report (BSR) during the 2-step RACH or send the BSR on an uplink resource obtained through the SR.

In some examples, the first sending module includes:
a first sending submodule configured to send the BSR during the 2-step RACH according to the resource configuration of the 2-step RACH in response to not configuring an SR resource.

In some examples, the first sending submodule is specifically configured to:
determine that the BSR is allowed to be sent during the 2-step RACH according to the resource configuration of the 2-step RACH in response to not configuring the SR resource, and send the BSR in an MSGA during the 2-step RACH.

In some examples, the first sending module includes:
a second sending submodule configured to send the BSR on the uplink resource obtained through the SR in response to configuring the SR resource but not configuring a 2-step RACH resource for sending the BSR.

In some examples, the first sending module includes:
a third sending submodule configured to send, according to a data volume of the BSR in response to configuring the SR resource and a 2-step RACH resource for sending the BSR, the BSR during the 2-step RACH or send the BSR on the uplink resource obtained through the SR:
or
a fourth sending submodule configured to send, according to quality of service (QoS) of a service corresponding to the BSR in response to configuring the SR resource and the 2-step RACH resource for sending the BSR, the BSR during the 2-step RACH or send the BSR on the uplink resource obtained through the SR;
or
a fifth sending submodule configured to send, according to a base station instruction in response to configuring the SR resource and the 2-step RACH resource for sending the BSR, the BSR during the 2-step RACH or send the BSR on the uplink resource obtained through the SR.

In some examples, the third sending submodule includes:
a first sending unit configured to send the BSR on the uplink resource obtained through the SR in response to determining that the data volume of the BSR is greater than a predetermined data volume threshold; and
a second sending unit configured to send the BSR during the 2-step RACH in response to determining that the data volume of the BSR is less than or equal to the predetermined data volume threshold.

In some examples, the fourth sending submodule includes:
a third sending unit configured to send the BSR on the uplink resource obtained through the SR in response to determining that an allowable delay of the QoS is greater than a predetermined duration threshold; and
a fourth sending unit configured to send the BSR during the 2-step RACH in response to determining that the allowable delay of the QoS is less than or equal to the predetermined duration threshold.

In some examples, the fifth sending submodule includes:
a fifth sending unit configured to send the BSR on the uplink resource obtained through the SR in response to the base station instruction to send the BSR on the uplink resource obtained through the SR; and
a sixth sending unit configured to send the BSR through an MSGA during the 2-step RACH in response to the base station instruction to send the BSR during the 2-step RACH.

In some examples, the apparatus further includes:
a first receiving module configured to receive the base station instruction through DCI, MAC_CE signaling, RRC signaling or an SIB.

Figure 7:
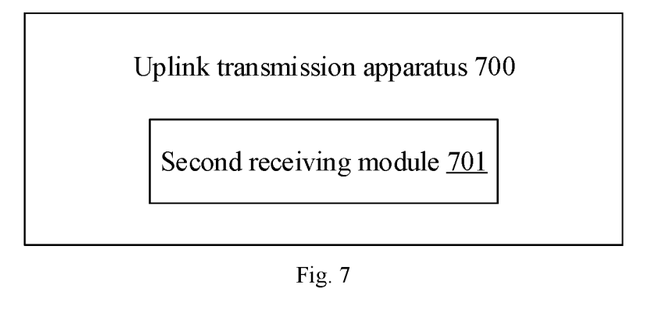
FIG. 7 is a schematic structural diagram 2 of an uplink transmission apparatus shown according to an example.

As shown in FIG. 7, an example of the disclosure further provides an uplink transmission apparatus 700. The method is applied to a base station and includes:
a second receiving module 701 configured to receive, according to resource configuration of an SR and resource configuration of a 2-step RACH, a BSR during the 2-step RACH or receive the BSR on an uplink resource configured through the SR.

In some examples, the second receiving module includes:
a first receiving submodule configured to receive the BSR during the 2-step RACH in response to not configuring an SR resource.

In some examples, the first receiving submodule is specifically configured to:
receive the BSR through an MSGA during the 2-step RACH in response to not configuring the SR resource but configuring a 2-step RACH resource of the 2-step random access.

In some examples, the second receiving module includes:
a second receiving submodule configured to receive the BSR on the uplink resource configured through the SR in response to configuring an SR resource but not configuring a 2-step RACH resource for sending the BSR.

In some examples, the second receiving module includes:
a third receiving submodule configured to receive, in response to configuring an SR resource and a 2-step RACH resource for sending the BSR, the BSR during the 2-step RACH or receive the BSR on the uplink resource configured through the SR.

In some examples, the apparatus further includes:
a second sending module configured to issue a base station instruction for instructing UE to send the BSR on the uplink resource configured through the SR or send the BSR during the 2-step RACH.

The second receiving module includes:
a fourth receiving submodule configured to receive the BSR during the 2-step RACH in response to configuring the SR resource and a 2-step RACH resource for sending the BSR and in response to the base station instruction to instruct the UE to send the BSR during the 2-step RACH; and
a fifth receiving submodule configured to receive the BSR on the uplink resource configured through the SR in response to configuring the SR resource and the 2-step RACH resource and in response to the base station instruction to instruct the UE to send the BSR on the uplink resource configured through the SR.

In some examples, the second sending module is specifically configured to:
issue the base station instruction based on DCI, MAC_CE signaling, RRC signaling or an SIB according to the resource configuration of the SR and the resource configuration of the 2-step RACH.

An example of the disclosure provides a communication device. The communication device includes a processor, a transceiver, a memory, and an executable program which is stored on the memory and may be run by the processor, and when running the executable program, the processor executes an uplink transmission method provided by the above technical solutions.

The communication device may be the above base station or UE.

The processor may include various types of storage medium. The storage medium are non-transitory computer storage medium that may continue to remember information stored after the communication device is powered off. The communication device includes the base station or the UE.

The processor may be connected to the memory through a bus, etc. for reading an executable program stored in the memory.

An example the disclosure provides a non-transitory computer-readable storage medium. The computer storage medium stores an executable program, and after being executed by a processor, the executable program may implement the method shown by any technical solution involved in an example of the disclosure.

Figure 8:
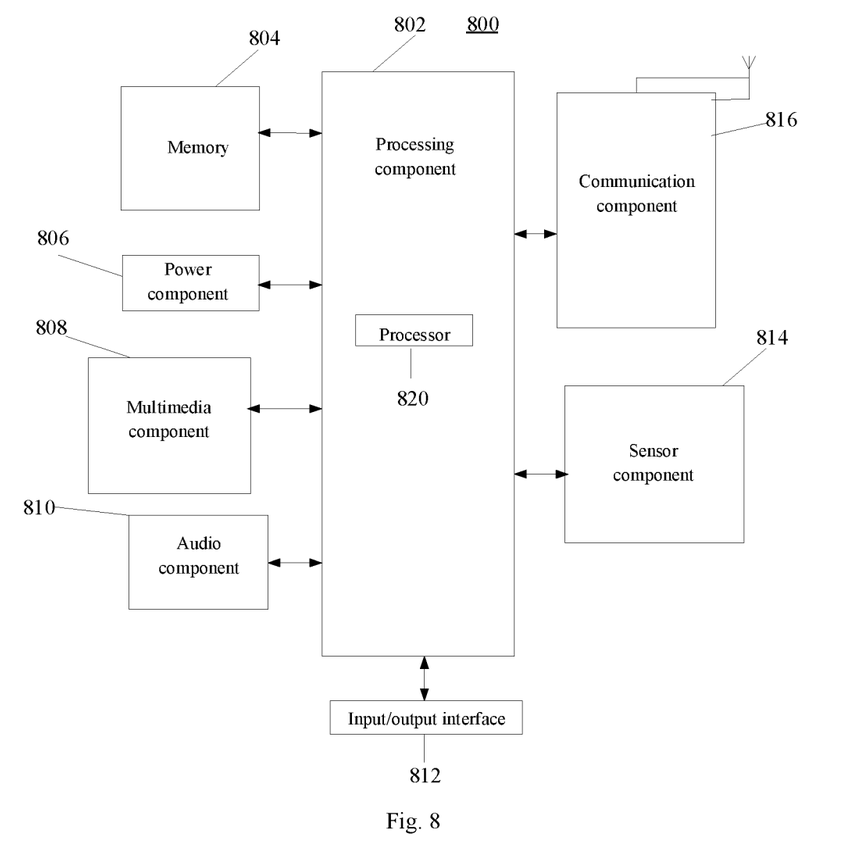
FIG. 8 is a schematic structural diagram 1 of a communication device shown according to an example.

FIG. 8 is a structural block diagram of a communication device provided in an example of the disclosure. The communication device may be UE. For example, the communication device 800 may be a mobile phone, a computer, a digital broadcast user device, a message receiving and sending device, a game console, a tablet device, a medical device, a fitness device, a personal digital assistant, etc.

With reference to FIG. 8, the communication device 800 may include at least one of the following components: a processing component 802, a memory 804, a power component 806, a multimedia component 808, an audio component 810, an input/output (I/O) interface 812, a sensor component 814, and a communication component 816.

The processing component 802 generally controls overall operation of the communication device 800, for example, operations associated with display, phone calls, data communication, camera operations, and recording operations. The processing component 802 may include at least one processor 820 to execute instructions so as to complete all or some of steps of the methods described above. In addition, the processing component 802 may include at least one module that facilitates interaction between the processing component 802 and other components. For example, the processing component 802 may include a multimedia module to facilitate interaction between the multimedia component 808 and the processing component 802.

The memory 804 is configured to store various types of data, so as to support the operations at the communication device 800. Instances of such data include an instruction, operated on the communication device 800, for any application or method, contact data, phonebook data, messages, pictures, video, etc. The memory 804 may be implemented through any type or combination of volatile or non-volatile memory devices, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 supplies power to the various components of the communication device 800. The power component 806 may include a power management system, at least one power supply, and other components associated with power generation, management, and distribution for the communication device 800.

The multimedia component 808 includes a screen that provides an output interface between the communication device 800 and the user. In some examples, the screen may include a liquid crystal display (LCD) and a touch panel (TP). In the case that the screen includes the touch panel, the screen may be implemented as a touch screen, so as to receive an input signal from the user. The TP includes at least one touch sensor to sense touch, swipe, and gestures on the TP. The touch sensor may sense not only a boundary of a touch or swipe, but also wake-up time and pressure associated with the touch or swipe. In some examples, the multimedia component 808 includes a front-facing camera and/or a rear-facing camera. When the communication device 800 is in an operation mode, such as a photographing mode or a video mode, the front-facing camera and/or the rear-facing camera may receive external multimedia data. Each of the front-facing camera and the rear-facing camera may be a fixed optical lens system or have a focal length and optical zoom capability.

The audio component 810 is configured to output and/or input an audio signal. For example, the audio component 810 includes a microphone (MIC) configured to receive an external audio signal when the communication device 800 is in the operation mode, for example, a call mode, a recording mode, and a speech recognition mode. The received audio signals may be further stored in the memory 804 or sent via the communication component 816. In some examples, the audio component 810 further includes a speaker for outputting the audio signal.

The I/O interface 812 provides an interface between the processing component 802 and a peripheral interface module. The above peripheral interface module may be a keyboard, a click wheel, a button, etc. The buttons may include, but are not limited to, a home button, a volume button, a start button and a lock button.

The sensor component 814 includes at least one sensor for providing state assessments of various aspects of the communication device 800. For example, the sensor component 814 may detect an on/off state of the communication device 800 and relative positioning of the components. For example, the components are a display and a keypad of the communication device 800. The sensor component 814 may also detect a change in position of the communication device 800 or an component of the communication device 800, the presence or absence of contact between the user and the communication device 800, orientation or acceleration/deceleration of the communication device 800, and temperature variation of the communication device 800. The sensor component 814 may include a proximity sensor configured for detecting the presence of a nearby object in the absence of any physical contact. The sensor component 814 may further include a light sensor, such as CMOS or a CCD image sensor for imaging applications. In some examples, the sensor component 814 may further include an acceleration sensor, a gyroscope sensor, a magnetic sensor, a pressure sensor or a temperature sensor.

The communication component 816 is configured to facilitate communication between the communication device 800 and other devices in a wired or radio manner. The communication device 800 may access a radio network based on a communication standard, for example, WiFi, 2G, or 3G, or their combination. In an example, the communication component 816 receives a broadcast signal or broadcast related information from an external broadcast management system through a broadcast channel. In an example, the communication component 816 further includes a near field communication (NFC) module to facilitate short-range communication. For example, the NFC module may be implemented based on a radio frequency identification (RFID) technology, an infrared data association (IrDA) technology, an ultra wide band (UWB) technology, a Bluetooth (BT) technology, etc.

In an example, the communication device 800 may be implemented by at least one application specific integrated circuit (ASIC), a digital signal processor (DSP), a digital signal processing device (DSPD), a programmable logic device (PLD), a field programmable gate array (FPGA), a controller, a microcontroller, a microprocessor and other electronic elements for executing the above methods.

An example further provides a non-transitory computer-readable storage medium including an instruction, for example, the memory 804 including an instruction, and the instruction may be executed by the processor 820 of the communication device 800 so as to complete the above methods. For example, the non-transitory computer-readable storage medium may be a ROM) a random access memory (RAM), CD-ROM, a magnetic tape, a floppy disk, an optical data storage device, etc.

Figure 9:
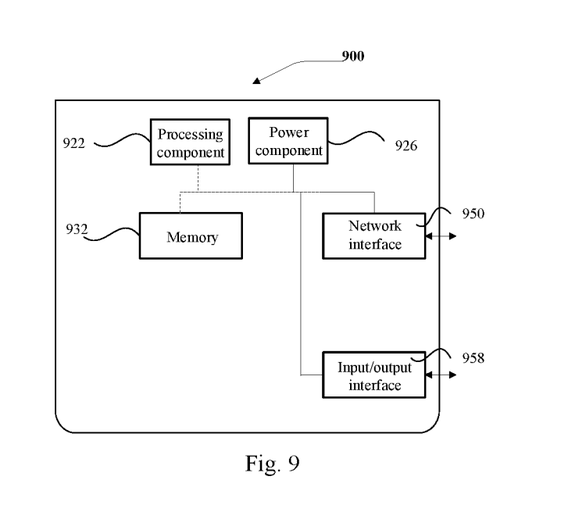
FIG. 9 is a schematic structural diagram 2 of a communication device shown according to an example.

As shown in FIG. 9, an example of the disclosure shows a structure of another communication device. The communication device may be the base station involved in an example of the disclosure. For example, the communication device 900 may be provided as a network device. With reference to FIG. 9, the communication device 900 includes a processing component 922, which further includes at least one processor, and a memory resource represented by a memory 932 for storing instructions, such as applications that are executable by the processing component 922. The applications stored in the memory 932 may include one or more modules, each of which corresponds to a set of instructions. Further, the processing component 922 is configured to execute the instructions, so as to execute the above methods applied to the communication device.

The communication device 900 may further include a power component 926 configured to implement power supply management of the communication device 900, a wired or radio network interface 950 configured to connect the communication device 900 with the network, and an input/output (I/O) interface 958. The communication device 900 may operate an operation system stored in the memory 932, such as Windows Server™, Mac OS X™, Unix™, Linux™, FreeBSD™, etc.

Those skilled in the art can readily conceive of other examples of the disclosure upon consideration of the description and practice of the disclosure. The disclosure is intended to cover any variations, uses or adaptive changes of the disclosure, and these variations, uses or adaptive changes follow general principles of the disclosure and include common general knowledge or customary technical means in the technical field not disclosed in the disclosure. The description and examples are considered as illustrative.

It can be understood that the disclosure is not limited to the precise structure that has been described above and shown in the accompanying drawings and can be modified and altered in various manners without departing from the scope of the disclosure.

The invention claimed is:

1. An uplink transmission method, applied to a terminal and comprising:
sending, according to resource configuration of a scheduling request (SR) and resource configuration of a 2-step random access channel (RACH), a buffer status report (BSR) during the 2-step RACH or sending the BSR on an uplink resource obtained through the SR;
wherein sending, according to the resource configuration of the SR and the resource configuration of the 2-step RACH, the BSR during the 2-step RACH or sending the BSR on the uplink resource obtained through the SR comprises:
in response to that an SR resource and a 2-step RACH resource for sending the BSR are configured, sending, according to quality of service (QOS) of a service corresponding to the BSR, the BSR during the 2-step RACH or sending the BSR on the uplink resource obtained through the SR; and
wherein sending, according to the QoS of the service corresponding to the BSR, the BSR during the 2-step RACH or sending the BSR on the uplink resource obtained through the SR comprises:
sending the BSR on the uplink resource obtained through the SR in response to an allowable delay of the QoS being greater than a predetermined duration threshold; and
sending the BSR during the 2-step RACH in response to the allowable delay of the QoS being less than or equal to the predetermined duration threshold.

2. The uplink transmission method according to claim 1, wherein sending, according to the resource configuration of the SR and the resource configuration of the 2-step RACH, the BSR during the 2-step RACH or sending the BSR on the uplink resource obtained through the SR comprises:
sending the BSR during the 2-step RACH according to the resource configuration of the 2-step RACH in response to not configuring the SR resource.

3. The uplink transmission method according to claim 2, wherein sending the BSR during the 2-step RACH according to the resource configuration of the 2-step RACH in response to not configuring the SR resource comprises:
determining that the BSR is allowed to be sent during the 2-step RACH according to the resource configuration of the 2-step RACH in response to not configuring the SR resource, and sending the BSR in a random access message A (MSGA) during the 2-step RACH.

4. The uplink transmission method according to claim 1, wherein sending, according to the resource configuration of the SR and the resource configuration of the 2-step RACH, the BSR during the 2-step RACH or sending the BSR on the uplink resource obtained through the SR comprises:

sending the BSR on the uplink resource obtained through the SR in response to configuring the SR resource but not configuring the 2-step RACH resource for sending the BSR.

5. An uplink transmission method, applied to a base station and comprising:
receiving, according to resource configuration of a scheduling request (SR) and resource configuration of a 2-step random access channel (RACH), a buffer status report (BSR) during the 2-step RACH or receiving the BSR on an uplink resource configured through the SR;
wherein receiving, according to the resource configuration of the SR and the resource configuration of the 2-step RACH, the BSR during the 2-step RACH or receiving the BSR on the uplink resource configured through the SR comprises:
in response to that an SR resource and a 2-step RACH resource for sending the BSR are configured, receiving, according to quality of service (QoS) of a service corresponding to the BSR, the BSR during the 2-step RACH or receiving the BSR on the uplink resource configured through the SR; and
wherein receiving, according to the QoS of the service corresponding to the BSR, the BSR during the 2-step RACH or receiving the BSR on the uplink resource configured through the SR comprises:
receiving the BSR on the uplink resource configured through the SR in response to an allowable delay of the QoS being greater than a predetermined duration threshold; and
receiving the BSR during the 2-step RACH in response to the allowable delay of the QoS being less than or equal to the predetermined duration threshold.

6. The uplink transmission method according to claim 5, wherein receiving, according to the resource configuration of the SR and the resource configuration of the 2-step RACH, the BSR during the 2-step RACH or receiving the BSR on the uplink resource configured through the SR comprises:
receiving the BSR during the 2-step RACH in response to not configuring the SR resource.

7. The uplink transmission method according to claim 6, wherein receiving the BSR during the 2-step RACH in response to not configuring the SR resource comprises:
receiving the BSR through an MSGA during the 2-step RACH of 2-step random access in response to not configuring the SR resource but configuring the 2-step RACH resource of the 2-step random access.

8. The uplink transmission method according to claim 5, wherein receiving, according to the resource configuration of the SR and the resource configuration of the 2-step RACH, the BSR during the 2-step RACH or receiving the BSR on the uplink resource configured through the SR comprises:

receiving the BSR on the uplink resource configured through the SR in response to configuring the SR resource but not configuring the 2-step RACH resource for sending the BSR.

9. A communication device, at least comprising: a processor and a memory for storing an executable instruction capable of being run on the processor, wherein
when the processor is configured to run the executable instruction, the executable instruction executes the following step:
sending, according to resource configuration of a scheduling request (SR) and resource configuration of a 2-step random access channel (RACH), a buffer status report (BSR) during the 2-step RACH or sending the BSR on an uplink resource obtained through the SR;
wherein sending, according to the resource configuration of the SR and the resource configuration of the 2-step RACH, the BSR during the 2-step RACH or sending the BSR on the uplink resource obtained through the SR comprises:
in response to that an SR resource and a 2-step RACH resource for sending the BSR are configured, sending, according to quality of service (QOS) of a service corresponding to the BSR, the BSR during the 2-step RACH or sending the BSR on the uplink resource obtained through the SR; and
wherein sending, according to the QoS of the service corresponding to the BSR, the BSR during the 2-step RACH or sending the BSR on the uplink resource obtained through the SR comprises:
sending the BSR on the uplink resource obtained through the SR in response to an allowable delay of the QoS being greater than a predetermined duration threshold; and
sending the BSR during the 2-step RACH in response to the allowable delay of the QoS being less than or equal to the predetermined duration threshold.

10. A non-transitory computer-readable storage medium, storing a computer-executable instruction, wherein the computer-executable instruction implements steps of the uplink transmission method provided in claim 1 when executed by a processor.

11. A communication device, at least comprising: a processor and a memory for storing an executable instruction capable of being run on the processor, wherein
when the processor is configured to run the executable instruction, the executable instruction executes the uplink transmission method provided in claim 5.

12. A non-transitory computer-readable storage medium, storing a computer-executable instruction, wherein the computer-executable instruction implements the uplink transmission method provided in claim 5 when executed by a processor.

* * * * *